(12) United States Patent
Nakatani

(10) Patent No.: US 8,553,000 B2
(45) Date of Patent: Oct. 8, 2013

(54) INPUT APPARATUS THAT ACCURATELY DETERMINES INPUT OPERATION, CONTROL METHOD FOR INPUT APPARATUS, AND STORAGE MEDIUM

(75) Inventor: Yu Nakatani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 303 days.

(21) Appl. No.: 12/974,503

(22) Filed: Dec. 21, 2010

(65) Prior Publication Data

US 2011/0157048 A1 Jun. 30, 2011

(30) Foreign Application Priority Data

Dec. 25, 2009 (JP) ................................. 2009-294624

(51) Int. Cl.
*G06F 3/041* (2006.01)
(52) U.S. Cl.
USPC ......... 345/173; 345/174; 178/18.01; 715/863
(58) Field of Classification Search
USPC .................... 345/173–178; 178/18.01–18.11; 715/863
See application file for complete search history.

(56) References Cited

U.S. PATENT DOCUMENTS

| | | | |
|---|---|---|---|
| 5,583,543 A | 12/1996 | Takahashi et al. | |
| 7,180,506 B2 * | 2/2007 | Lin et al. | 345/173 |
| 7,254,775 B2 * | 8/2007 | Geaghan et al. | 715/701 |
| 2006/0007166 A1 * | 1/2006 | Lin et al. | 345/173 |
| 2008/0178126 A1 * | 7/2008 | Beeck et al. | 715/863 |
| 2009/0262089 A1 * | 10/2009 | Wang | 345/173 |
| 2011/0199312 A1 * | 8/2011 | Okuta | 345/173 |

FOREIGN PATENT DOCUMENTS

| | | |
|---|---|---|
| JP | 06-161647 | 6/1994 |
| JP | 09-044308 A | 2/1997 |
| JP | 2004-355426 A | 12/2004 |
| JP | 04073448 | 2/2008 |

\* cited by examiner

*Primary Examiner* — Koosha Sharifi-Tafreshi
(74) *Attorney, Agent, or Firm* — Cowan, Liebowitz & Latman, P.C.

(57) ABSTRACT

An input apparatus that accurately determines an input operation intended by a user without erroneously determining an operation including no move as an operation including move. Touch positions in a time period from touch-down to touch-up by an input operation performed on a touch panel by the user are recorded in chronological order. A statistical variance of the touch positions is calculated based on the obtained touch positions. Whether the input operation is an operation including no move or an operation including move is determined based on the calculated variance. When the calculated variance is smaller than a threshold value, it is determined that the input operation is the operation including no move, and when the calculated variance is not smaller than the threshold value, it is determined that the input operation is the operation including move.

11 Claims, 9 Drawing Sheets

INPUT APPARATUS THAT ACCURATELY DETERMINES INPUT OPERATION, CONTROL METHOD FOR INPUT APPARATUS, AND STORAGE MEDIUM

BACKGROUND OF THE INVENTION

1. Field of the Invention

The present invention relates to an input apparatus having a touch panel on which input operations are performed by a user, a control method for the input apparatus, and a computer-readable storage medium storing a program for causing a computer to implement the method.

2. Description of the Related Art

When a user performs an input operation on a touch panel with a finger, a pen, or the like, an input apparatus having the touch panel determines the input operation. Here, the input operation performed on the touch panel by the user with a finger, a pen, or the like is a combination of the following acts (gestures):

(1) an act of touching the touch panel with a finger, a pen, or the like (hereafter referred to as "touch-down")

(2) an act of moving a finger or a pen in a state in which the finger or the pen touches the touch panel (hereafter referred to as "move")

(3) an act of moving a finger or a pen off the touch panel (hereafter referred to as "touch-up") Also, a state in which a finger or a pen touches the touch panel is referred to as touch-on, and a state in which a finger or a pen does not touch the touch panel is referred to as touch-off.

Examples of an input operation performed on the touch panel by combining the above-mentioned acts include a tapping operation, a dragging operation, and a flicking operation. The tapping operation is an operation to lightly tap a desired region on the touch panel with a finger, a pen, or the like, that is, an operation to perform touch-up immediately after touch-down without performing move. The dragging operation is an operation to perform move after touch-down as if to slowly move an object, and then perform touch-up. The flicking operation is an operation to move a finger or a pen touching the touch panel off the touch panel by quickly moving the finger or the pen a certain distance. In other words, the flicking operation is an operation to quickly drag a finger or a pen over the touch panel as if to flip the touch panel.

For such an input apparatus having the touch panel on which an input operation can be performed, there has been a demand to detect an input operation without error.

For example, as a method to detect an operation including move such as a dragging operation without error, there is a method that calculates an amount of change in the sensitivity of the touch panel, and determines whether move is directed toward left or right based on the calculated amount of change in sensitivity (see Japanese Patent Registration No. 04073448).

Also, there is a method that, when a user performs touch-down, sets a region of a predetermined size (a region of a minute size) around a position at which the touch-down has been performed, and when there is a move out of the set region, determines that the move is valid (see Japanese Laid-Open Patent Publication (Kokai) No. H06-161647).

However, according to the conventional detection methods, there may be a case where when a user performs a tapping operation, a minute movement of a finger or a pen unintended by the user during touch-on is detected, and it is erroneously determined that the tapping operation is an operation including move (for example, a dragging operation or a flicking operation), and as a result, an operation unintended by the user is input, and a process unintended by the user is performed.

SUMMARY OF THE INVENTION

The present invention provides an input apparatus that accurately determines an input operation intended by a user without erroneously determining an operation including no move as an operation including move, a control method for the input apparatus, and a computer-readable storage medium storing a program for causing a computer to implement the method.

Accordingly, a first aspect of the present invention provides an input apparatus comprising a touch panel on which an input operation is performed by a user, an obtainment unit configured to obtain, in chronological order, touch positions in a time period from touch-down to touch-up by the input operation on the touch panel, a calculation unit configured to calculate a statistical variance of the touch positions based on the touch positions obtained by the obtainment unit, and a determination unit configured to determine whether the input operation is an operation including no move or an operation including move based on the statistical variance calculated by the calculation unit, wherein when the calculated statistical variance is smaller than a threshold value, the determination unit determines that the input operation is the operation including no move, and when the calculated statistical variance is not smaller than the threshold value, the determination unit determines that the input operation is the operation including move.

Accordingly, a second aspect of the present invention provides a control method for an input apparatus having a touch panel on which an input operation is performed by a user, comprising an obtainment step of obtaining, in chronological order, touch positions in a time period from touch-down to touch-up by the input operation on the touch panel, a calculation step of calculating a statistical variance of the touch positions based on the touch positions obtained in the obtainment step, and a determination step of determining whether the input operation is an operation including no move or an operation including move based on the statistical variance calculated in the calculation step, wherein when the calculated statistical variance is smaller than a threshold value, it is determined that the input operation is the operation including no move, and when the calculated statistical variance is not smaller than the threshold value, it is determined that the input operation is the operation including move.

Accordingly, a third aspect of the present invention provides a computer-readable non-transitory storage medium storing a program for controlling an input apparatus having a touch panel on which an input operation is performed by a user, comprising an obtainment step of obtaining, in chronological order, touch positions in a time period from touch-down to touch-up by the input operation on the touch panel, a calculation step of calculating a statistical variance of the touch positions based on the touch positions obtained in the obtainment step, and a determination step of determining whether the input operation is an operation including no move or an operation including move based on the statistical variance calculated in the calculation step, wherein when the calculated statistical variance is smaller than a threshold value, it is determined that the input operation is the operation including no move, and when the calculated statistical variance is not smaller than the threshold value, it is determined that the input operation is the operation including move.

According to the present invention, an input operation intended by a user can be accurately determined without erroneously determining an operation including no move as an operation including move.

Further features of the present invention will become apparent from the following description of exemplary embodiments (with reference to the attached drawings).

DESCRIPTION OF THE EMBODIMENTS

The present invention will now be described in detail with reference to the drawings showing embodiments thereof.

Figure 1:
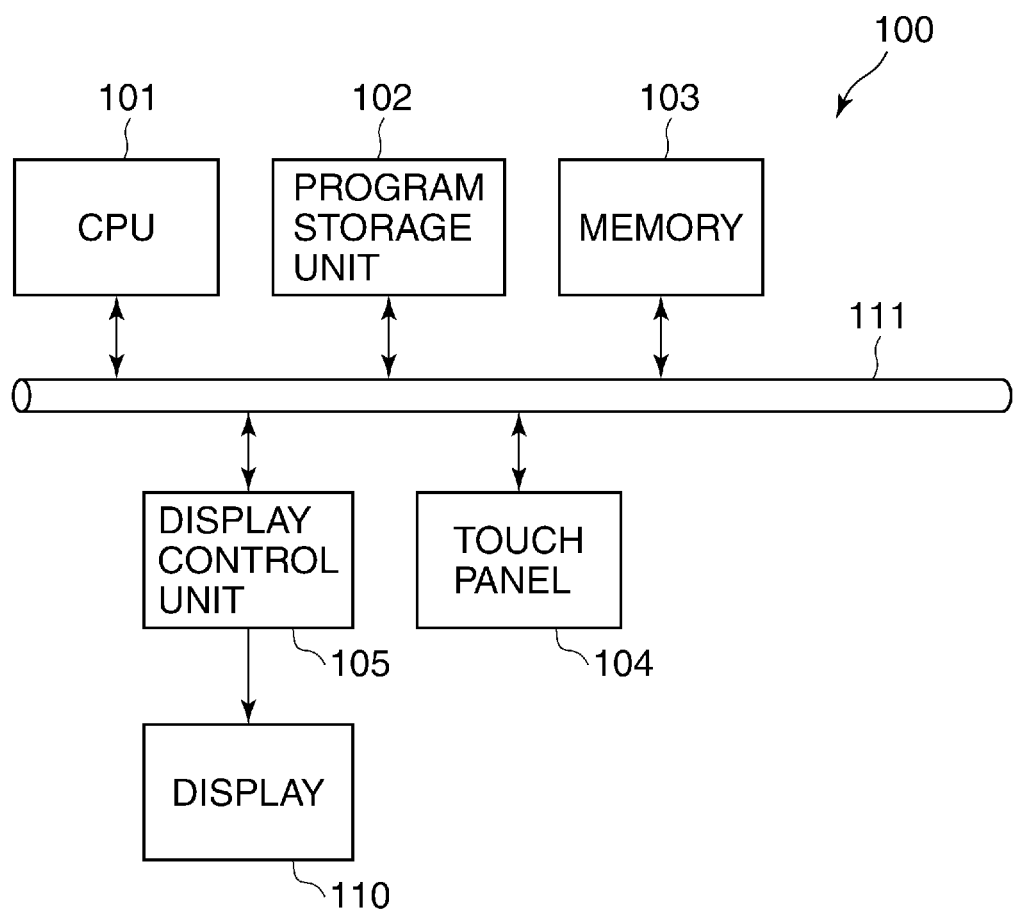
FIG. 1 is a block diagram schematically showing an arrangement of an essential part of an information processing apparatus in which an input apparatus according to a first embodiment of the present invention is incorporated.

FIG. 1 is a block diagram schematically showing an arrangement of an essential part of an information processing apparatus in which an input apparatus according to a first embodiment of the present invention is incorporated. In the following description, it is assumed that on the input apparatus, an operation including no move (a tapping operation) or an operation including move (a dragging operation or a flicking operation) is performed as an input operation by a user.

Referring to FIG. 1, the input apparatus according to the present embodiment is incorporated in an information processing apparatus 100 such as a PC (personal computer). The information processing apparatus 100 has a CPU 101, a program storage unit 102, a memory 103, a touch panel 104, and a display control unit 105, which can exchange data with each other via an internal bus 111.

The CPU 101 controls components of the information processing apparatus 100 and performs various processes in accordance with various programs stored in the program storage unit 102. The CPU 101 has a timer (not shown) incorporated therein. The program storage unit 102 is comprised of, for example, a ROM, a flash ROM, or a hard disk. The memory 103 is comprised of, for example, a RAM, and provides a work area for the CPU 101 when the CPU 101 performs control or processes.

The touch panel 104 has an operation surface on which input operations are performed by a user, and detects whether the operation surface is in a touch-on state or a touch-off state, and also detects a touch position touched by the user with a pen or a finger. The touch panel 104 sends a touch state signal indicative of whether the operation surface is in the touch-on state or the touch-off state, and coordinate information indicative of the touch position to the CPU 101 via the internal bus 111. Here, on the operation surface, x and y axes perpendicular to each other are defined in advance, and the coordinate information is indicative of a position of the x axis and a position of the y axis. The touch panel 104 is attached to a display screen of a display 110, described later, and the light transmittance of the touch panel 104 is set so as not to interfere with display of the display 110.

The display control unit 105 controls display of the display 110 based on display control signals generated by the CPU 101 in accordance with programs. The display 110 is comprised, for example, a liquid crystal display device.

For example, based on display control signals generated by the CPU 101, the display control unit 105 controls the display 110 so that the display 110 can display a screen for configuring a user interface screen in cooperation with the touch panel 104. Here, coordinates on the touch panel 104 correspond to coordinates on the display screen on the display 110. Thus, the display 110 and the touch panel 104 cooperate with each other to configure a user interface screen on which an input operation is performed by the user directly with a pen or a finger.

Specifically, the touch panel 104 sends, to the CPU 101, a touch state signal and coordinate information corresponding to the input operation performed on the operation surface of the touch panel 104. Based on the touch state signal and the coordinate information from the touch panel 104, the CPU 101 determines a user's input operation, and performs a process according to the input operation.

Figure 2A:
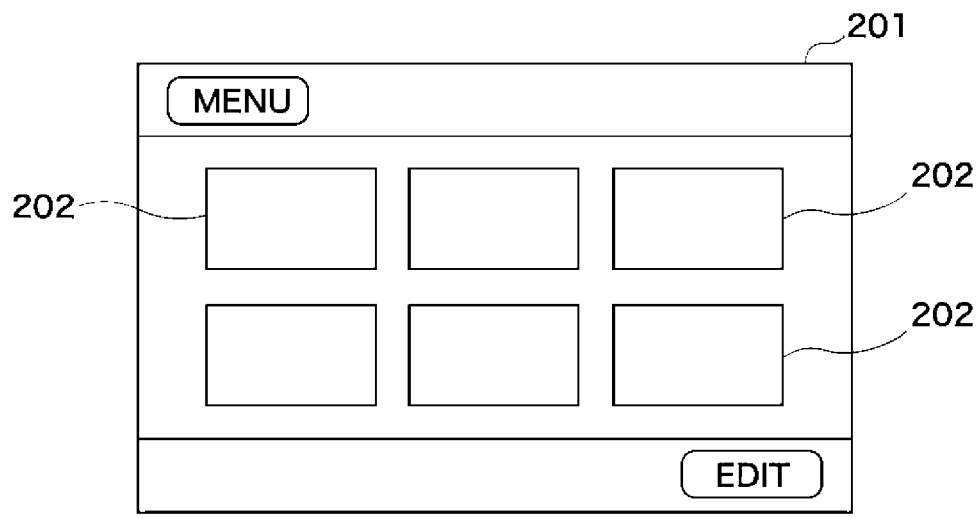
FIG. 2A is a view showing an exemplary user interface screen.
Figure 2B:
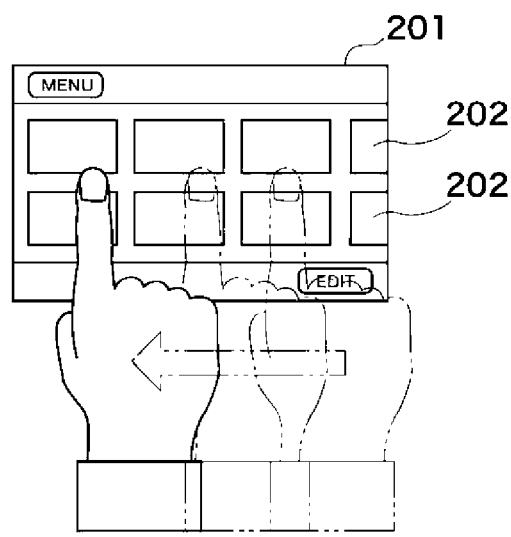
FIG. 2B is a view showing a dragging operation performed on the user interface screen in FIG. 2A.
Figure 2C:
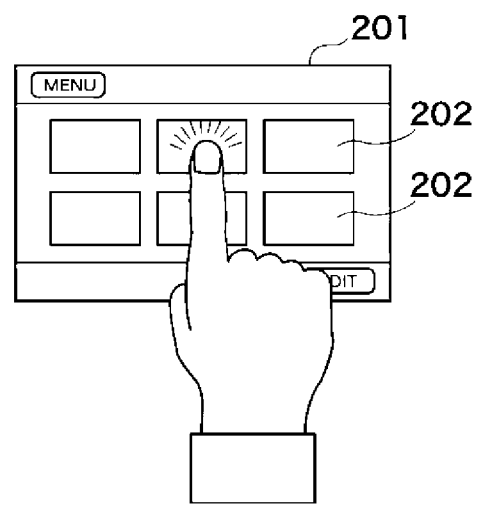
FIG. 2C is a view showing a tapping operation performed on the user interface screen in FIG. 2A.

Referring next to FIGS. 2A to 2C, a description will be given of a user interface screen on which input operations are performed by the user. FIG. 2A is a view showing an exemplary user interface screen. FIG. 2B is a view showing a dragging operation performed on the user interface screen in FIG. 2A. FIG. 2C is a view showing a tapping operation performed on the user interface screen in FIG. 2A.

For example, assume that the information processing apparatus 100 has a storage medium (not shown) in which image data is stored. Also, assume that as a user interface screen on which input operations are performed for image data stored in the storage medium, a screen 201 shown in FIG. 2A is displayed on the display 110. In a central part of the user interface screen 201, a list of thumbnail images 202 corresponding to the image data stored in the storage medium is displayed. Also, operation buttons such as a "MENU" button and an "EDIT" button are displayed in upper and lower parts, respectively, of the user interface screen 201.

Here, as shown in FIG. 2B, to scroll the displayed list of thumbnail images 202, the user performs a dragging operation over a display region of the user interface screen 201 where the list of thumbnail images 202 is displayed. In response to the dragging operation, the CPU 101 performs a process to scroll the thumbnail image list display region.

Namely, the CPU 101 loads the next image data from the storage medium into the memory 103, and generates thumbnail images. Then, the CPU 101 sends, to the display control unit 105, a display control signal for scrolling the thumbnail image display region at a moving speed and by a scroll amount according to the dragging operation. Based on the display control signal from the CPU 101, the display control unit 105 controls display of the display 110 so that the thumbnail images can be read out form the memory 103 to scroll the thumbnail image list.

Also, as shown in FIG. 2C, to display in full screen an image corresponding to a thumbnail image 202 desired by the user among the thumbnail images 202 displayed in list form, the user performs a tapping operation in which he/she taps a place where the desired thumbnail image 202 is displayed with a finger. In response to the tapping operation, the CPU 101 performs a process to display in full screen an image corresponding to the thumbnail image 202 at the touch position touched by the tapping operation. Namely, the CPU 101 sends, to the display control unit 105, a display control signal for displaying in full screen image data corresponding to the thumbnail image 202 lying at the touch position touched by the tapping operation. Based on the display control signal from the CPU 101, the display control unit 105 controls display of the display 110 so that the image data can be read out from the memory 103 and displayed in full screen.

Also, when the tapping operation is performed on an operation button located in the upper or lower part of the user interface screen, the CPU 101 performs a process assigned to the operation button. For example, when the tapping operation is performed on the "EDIT" button by the user, an edit mode is performed. In the edit mode, when a desired thumbnail image 202 is selected by the tapping operation, a process is performed to delete image data corresponding to the selected thumbnail image 202 from the storage medium.

In the present embodiment, an input operation determination process is performed to discriminate between an operation including no move (a tapping operation) and an operation including move (a dragging operation or the flicking operation). In the input operation determination process, first, when touch-down is performed on the touch panel 104 through an input operation by the user, touch positions during a time period from the touch-down to touch-up are stored in chronological order in the memory 103.

When touch-up is performed before a predetermined time period Tmax elapses from touch-down, statistical variances S of the touch positions recorded in the memory 103 are calculated. Then, based on the calculated variances S, it is determined whether the input operation by the user is an operation including no move (a tapping operation) or an operation including move (a dragging operation or a flicking operation).

Figure 3:
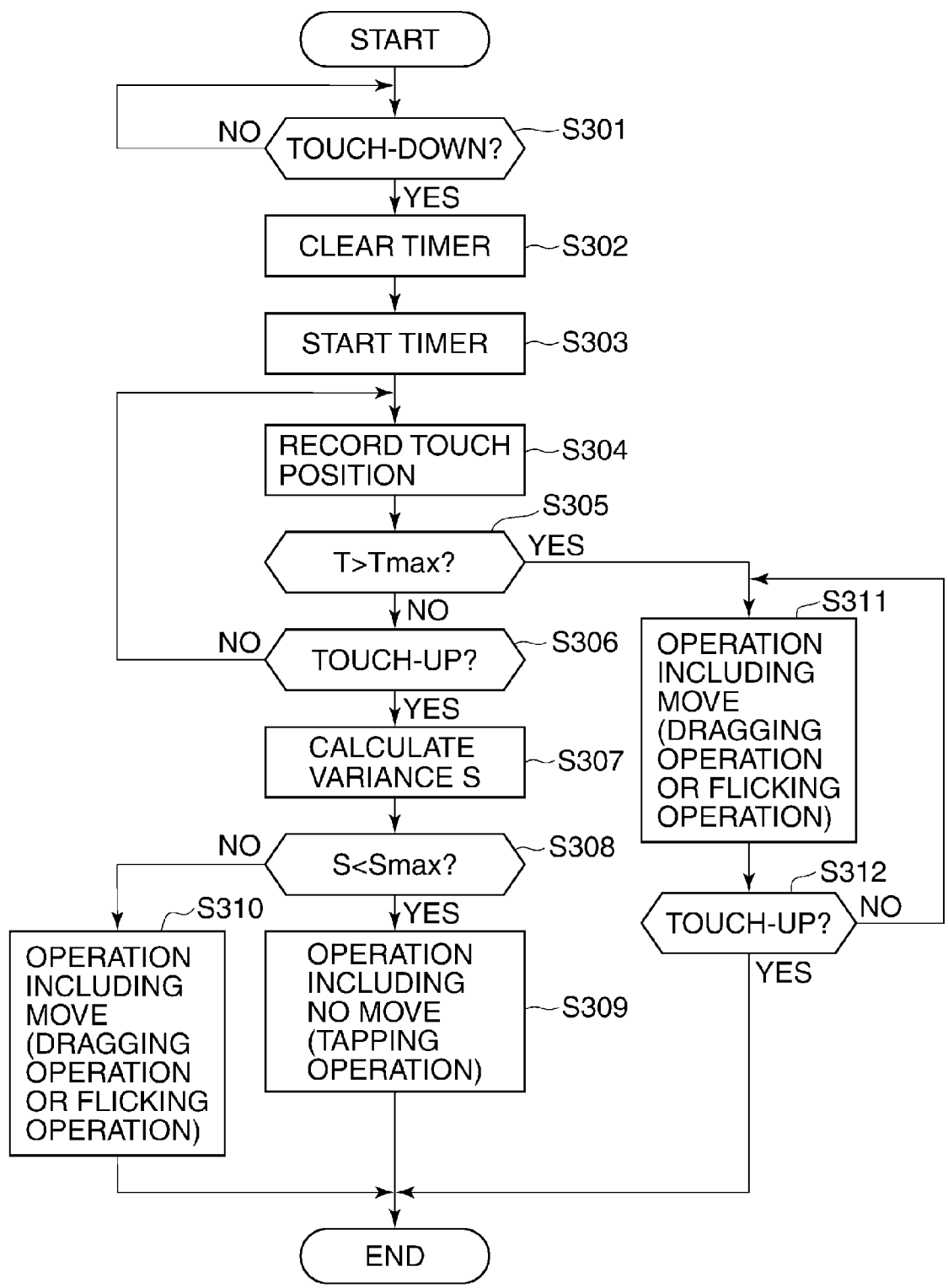
FIG. 3 is a flowchart of the procedure of an input operation determination process according to the first embodiment.

Referring now to FIG. 3, a detailed description will be given of the input operation determination process. FIG. 3 is a flowchart of the procedure of the input operation determination process according to the first embodiment. The procedure in the flowchart of FIG. 3 is performed by the CPU 101 in accordance with a program stored in the program storage unit 102.

Referring to FIG. 3, the CPU 101 monitors touch state signals from the touch panel 104, and waits until touch-down is performed on the touch panel 104 (step S301). Here, when a touch state signal indicative of a touched-on state is output from the touch panel 104, the CPU 101 determines that touch-down has been performed on the touch panel 104. When touch-down has been performed on the touch panel 104, the CPU 101 clears the timer incorporated therein (step S302).

Next, the CPU 101 starts the timer (step S303). Then, the CPU 101 records coordinate information indicative of touch positions at a time period T (an elapsed time period from touch-down to the present) measured by the timer sent from the touch panel 104 in association with the time period T in the memory 103 (step S304).

Next, the CPU 101 determines whether or not the time period T measured by the timer has exceeded a predetermined time period Tmax (step S305). Here, when determining that the time period T measured by the timer has not exceeded the predetermined time period Tmax, the CPU 101 determines whether or not touch-up has been performed on the touch panel 104 based on the touch state signal from the touch panel 104 (step S306). Here, when a touch state signal indicative of a touch-off state is output from the touch panel 104, the CPU 101 determines that touch-up has been performed. When determining that touch-up has not been performed, the CPU 101 returns to the step S304.

When determining in the step S306 that touch-up has been performed, the CPU 101 calculates variances S of the touch positions based on the coordinate information indicative of the touch positions recorded in the memory 103 (step S307). Here, it is assumed that as the coordinate information indicative of the touch positions recorded in the memory 103 (coordinate information on the touch positions from touch-down to touch-up), n pieces of coordinate information Pi (xi, yi) (i=1 to n) are recorded in the memory 103.

First, the CPU 101 reads out the n pieces of coordinate information Pi (xi, yi) (i=1 to n), which are recorded in the memory 103, from the memory 103, and calculates average values Ax and Ay using the following equations (1):

$$Ax=(x1+\ldots+xn)\div n$$

$$Ay=(y1+\ldots+yn)\div n \qquad (1)$$

Here, xi in the coordinate information Pi (xi, yi) designates a position in the direction of the x axis defined on the operation surface of the touch panel 104, and yi designates a position in the direction of the y axis perpendicular to the x axis.

Then, the CPU 101 calculates variances Sx and Sy using the calculated average values Ax and Ay using the following equations (2):

$$Sx=\{(x1-Ax)^2+\ldots+(xn-Ax)^2\}\div n$$

$$Sy=\{(y1-Ay)^2+\ldots+(yn-Ay)^2\}\div n \qquad (2)$$

where the variance Sx is a variance in the direction of the x axis, and the variance Sy is a variance in the direction of the y axis.

Then, the CPU 101 determines whether or not the calculated variances Sx and Sy are smaller than respective threshold values Sxmax and Symax (step S308). When determining that the calculated variances Sx and Sy are smaller than the respective threshold values Sxmax and Symax, the CPU 101 determines that the input operation is an operation including no move (a tapping operation) (step S309). Then, the CPU 101 terminates the present process.

When determining in the step S308 that the calculated variances Sx and Sy are not smaller than the respective threshold values Sxmax and Symax, the CPU 101 determines that the input operation is an operation including move (a dragging operation or a flicking operation) (step S310). Then, the CPU 101 terminates the present process.

As described above, when touch-up is performed before the predetermined time period Tmax elapses after touch-down, an input operation is determined based on the variances S (the steps S308 to S310), and a process appropriate to the input operation is performed. When the input operation is an operation including no move, that is, a tapping operation, the average values Ax and Ay are determined as being indicative of a touch position in the tapping operation, a process associated with the touch position is performed. When the input operation is an operation including move, that is, a dragging operation or a flicking operation, a moving direction, a moving speed, and so on for use in a process assigned to a dragging operation or a flicking operation are calculated based on the coordinate information indicative of the touch positions recorded in the memory 103. Then, the process assigned to a dragging operation or a flicking operation is performed in the moving direction and at the moving speed.

When determining in the step S305 that the time period T measured by the timer has exceeded the predetermined time period Tmax, the CPU 101 determines that the input operation is an operation including move (a dragging operation or a flicking operation) (step S311). In response to the determination, in order that processes can be started in a manner successively following changes in touch position caused by the operation including move, coordinate information on present touch positions is successively passed to applications carrying out the processes. Then, based on a touch state signal from the touch panel 104, the CPU 101 determines whether or not touch-up has been performed (step S312). Here, when determining that touch-up has not been performed, the CPU 101 returns to the step S311. When determining in the step S312, that touch-up has been performed, the CPU 101 determines that the operation including move has ended, and terminates the present process.

As described above, when the predetermined time period Tmax elapses from touch-down to touch-up, it is determined that an input operation is an operation including move without determining the input operation based on the variances S. Then, a process assigned to a dragging operation or a flicking operation is performed in a moving direction and at a moving speed based on coordinate information on touch positions from touch-down to touch-up.

Figure 4A:
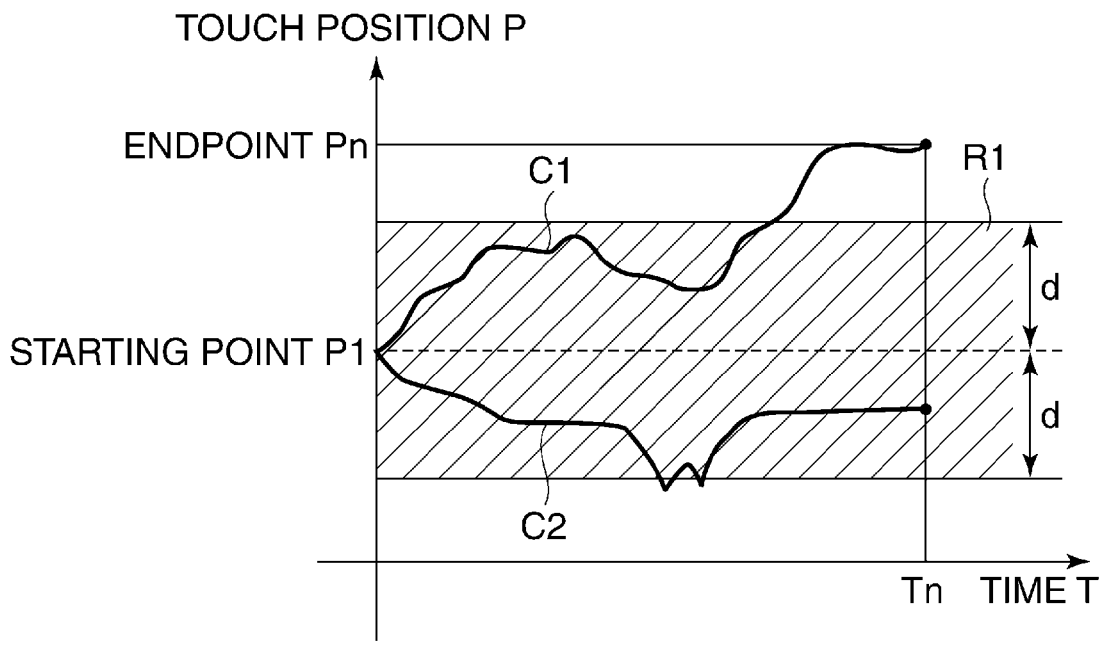
FIG. 4A is a diagram showing an example in which a conventional determination method is applied to changes in touch position with the passage of time from touch-down.
Figure 4B:
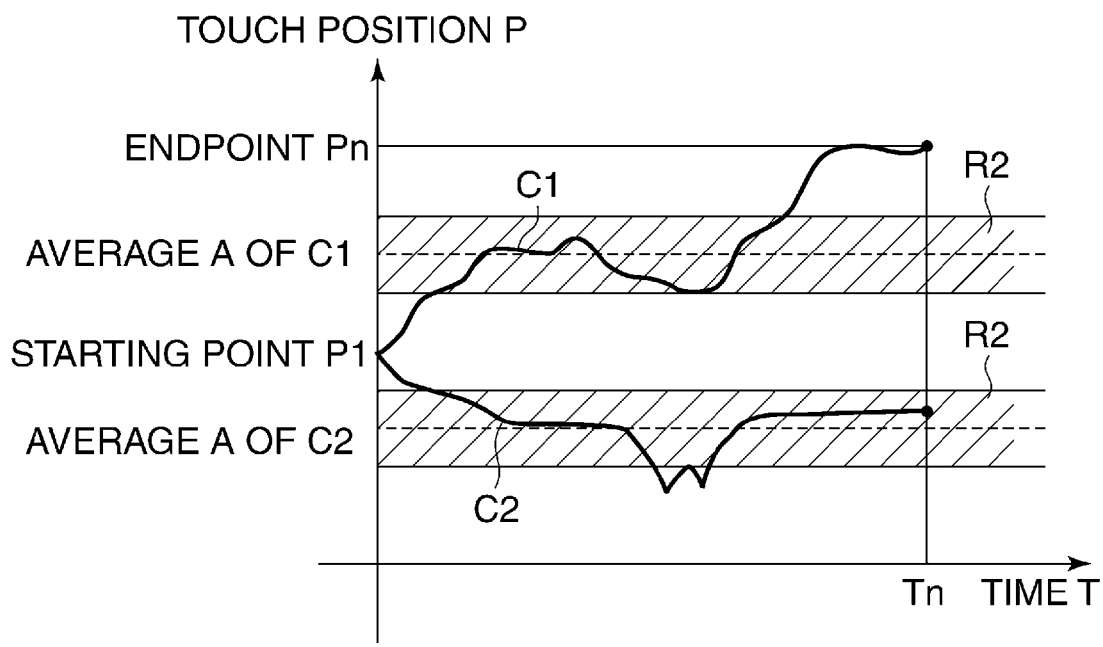
FIG. 4B is a diagram showing an example in which a determination method according to the first embodiment is applied to changes in touch position with the passage of time from touch-down.

Referring now to FIGS. 4A and 4B, a description will be given of effects obtained by determination of an input operation based on the variances S according to the present embodiment. FIG. 4A is a diagram showing an example in which a conventional determination method is applied to changes in touch position with the passage of time from touch-down. FIG. 4B is a diagram showing an example in which a determination method according to the first embodiment is applied to changes in touch position with the passage of time from touch-down.

According to the above described conventional method (the method described in Japanese Laid-Open Patent Publication (Kokai) No. H06-161647), as shown in FIG. 4A, a region with a width d is set around a first touch position, that is, a starting point P1, and when a touch position P goes out of the set region, it is determined that an input operation is a dragging operation.

In the case of a tapping operation, for example, there may be a case where a first touch position P (the starting point P1) differs from a position intended by the user, and the touch position P shifts from the starting point P1 to an endpoint Pn with the passage of time T from touch-down to touch-up as shown in FIG. 4A. This change in touch position P is expressed by a curve C1, for example. Also, there may be a case where the touch position P appears to shift due to effects of noise and the like as expressed by a curve C2.

In the case of the conventional method, as shown in FIG. 4A, a region R1 with the width d (a minute region) is set around the first touch position, that is, the starting point P1.

However, because the set region R1 is the minute region, there may be a case where part of the touch positions P may go out of the set region (the curve C1 or C2 in FIG. 4A). When part of the touch positions P goes out of the set region, it is erroneously determined that a tapping operation is an operation including move, for example, a dragging operation.

On the other hand, in the present embodiment, an average value A of touch positions P expressed by a curve C1 or C2 (the same as the curve C1 or C2 in FIG. 4A) is calculated as shown in FIG. 4B. Then, variations in touch position P relative to the average value A are evaluated by the variance S and the threshold value Smax. In the present example, there is not a wide range of variation in touch position P (the curve C1 or C2 in FIG. 4B) relative to the average value A (the variance S<the threshold value Smax), and many of the touch positions P are inside a region R2. Thus, even when part of the touch positions P are outside the region R2, it is not erroneously determined that a tapping operation involving changes in touch position P during touching is an operation including move, for example, a dragging operation insofar as many of the touch positions P are inside the region R2.

Thus, according to the present embodiment, as distinct from the conventional method, it is not erroneously determined that a tapping operation involving changes in touch position P during touching is an operation including move, for example, a dragging operation. Moreover, because a position indicated by the average value A is regarded as a touch position P by a tapping operation, coordinate information indicative of a touch position very close to a touch position intended by the user can be obtained even when a first touch position P1 (starting point) differs from a position intended by the user. Namely, an operation intended by the user can be input with accuracy.

In the present embodiment, the variances Sx and Sy are calculated using the above equations (2). Alternatively, distances from the average values Ax and Ay may be calculated, and variances may be calculated using the distances.

Moreover, when the direction of movement (the direction of move) by a dragging operation is limited to, for example, a direction of one axis, an average value and a variance have only to be calculated with respect to the direction of one axis. For example, in the case of the user interface screen shown in FIG. 2A, because the direction in which the region where a list of thumbnail images is displayed is scrolled is limited to the direction of the x axis, an average value and a variance are calculated with respect to the direction of x axis.

Moreover, a dragging operation and a flicking operation, which are operations including move, may be distinguished from each other using a method explained hereafter. Specifically, first, the amount of change in touch position per unit time is obtained based on coordinate information on touch positions. Then, when the obtained amount of change in touch position per unit time is smaller than a threshold value set in advance, it is determined that an input operation is a dragging operation, and when the obtained amount of change in touch position per unit time is equal to or greater than the threshold value set in advance, it is determined that an input operation is a flicking operation.

Moreover, the threshold values Sxmax and Symax for the variances Sx and Sy may be, for example, fixed values set in advance, but threshold values Sxmax and Symax determined with consideration given to a user's habit in performing an input operation may be set.

Figure 5A:
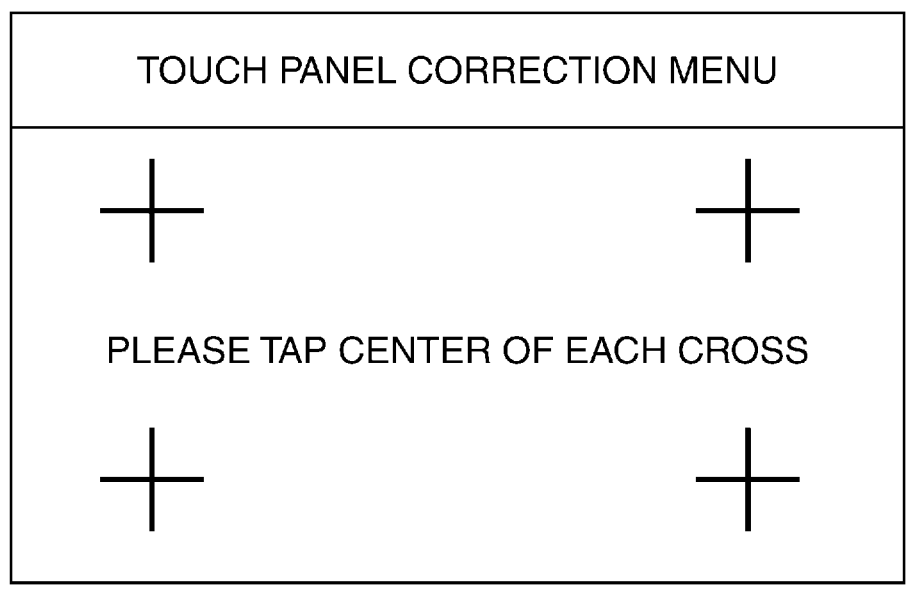
FIG. 5A is a view showing an exemplary tapping operation screen for setting threshold values Sxmax and Symax with consideration given to a user's habit in performing an input operation.
Figure 5B:
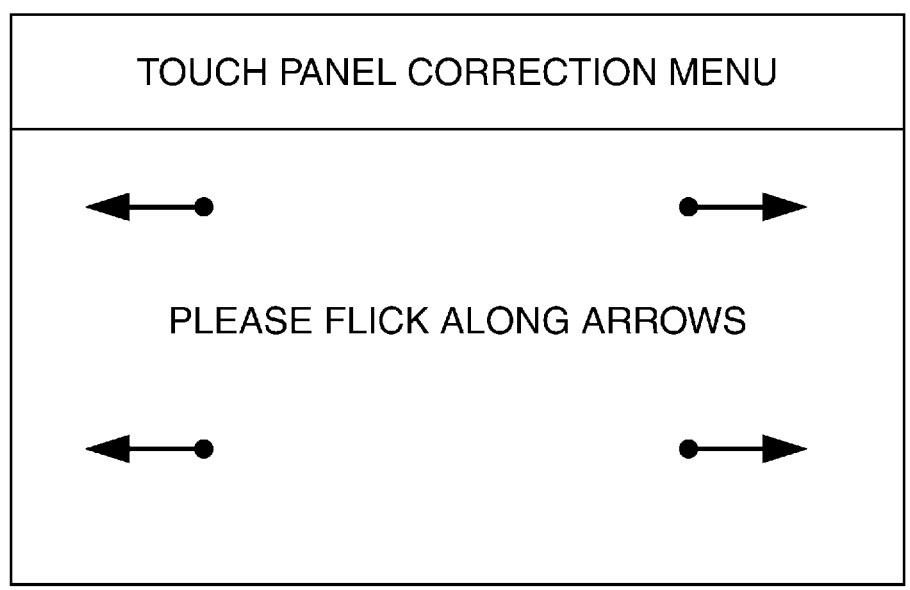
FIG. 5B is a view showing an exemplary flicking operation screen for setting threshold values Sxmax and Symax with consideration given to a user's habit in performing an input operation.

Referring to FIGS. 5A and 5B, a description will be given of a method to set the threshold values Sxmax and Symax determined with consideration given to a user's habit in performing an input operation. FIG. 5A is a view showing an exemplary tapping operation screen for setting the threshold values Sxmax and Symax with consideration given to a user's habit in performing an input operation. FIG. 5B is a view showing an exemplary flicking operation screen for setting the threshold values Sxmax and Symax with consideration given to a user's habit in performing an input operation.

When the threshold values Sxmax and Symax with consideration given to a user's habit in performing an input operation are to be set, for example, the tapping operation screen shown in FIG. 5A and the flicking operation screen shown in FIG. 5B are displayed on the display 110 under the control of the CPU 101. The tapping operation screen displays a plurality of tapping operation positions at which tapping operations are performed (positions indicated by marks "+" in FIG. 5A). The flicking operation screen displays a plurality of flicking operation positions at which and operating directions in which flicking operations are performed (starting points of arrows and directions indicated by the arrows in FIG. 5B).

The user performs tapping operations on a trial basis on the respective tapping operation positions displayed on the tapping operation screen. Also, the user performs flicking operations on a trial basis on the respective flicking operation positions displayed on the flicking operation screen. The CPU 101 calculates variances of touch positions at the moment the user performs touch-down during the tapping operations, and variances of touch positions at the moment the user performs touch-down during the flicking operations. Then, based on the calculated variances, the CPU 101 obtains such variances as to make it possible to discriminate between a tapping operation and a flicking operation, and sets the variances as the threshold values Sxmax and Symax.

Figure 6:
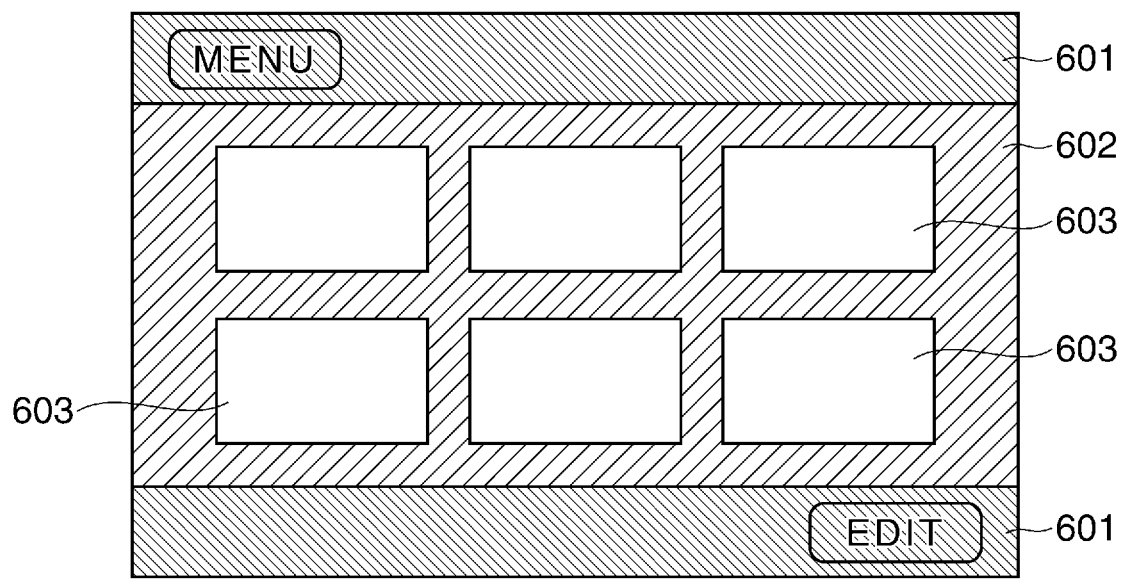
FIG. 6 is a view showing an exemplary user interface screen displayed by an input apparatus according to a second embodiment of the present invention.
Figure 7:
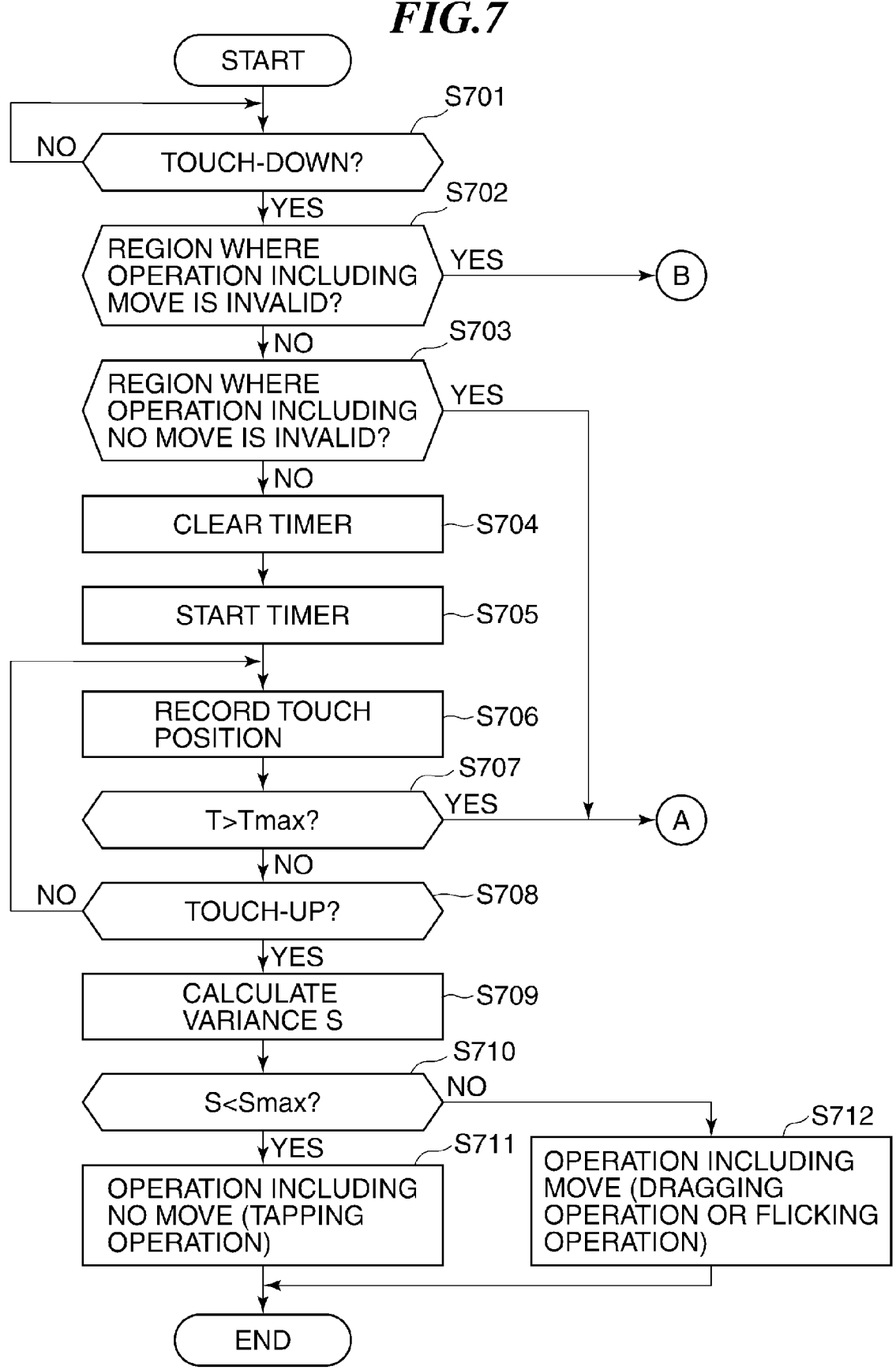
FIG. 7 is a flowchart of the procedure of an input operation determination process according to the second embodiment.
Figure 8:
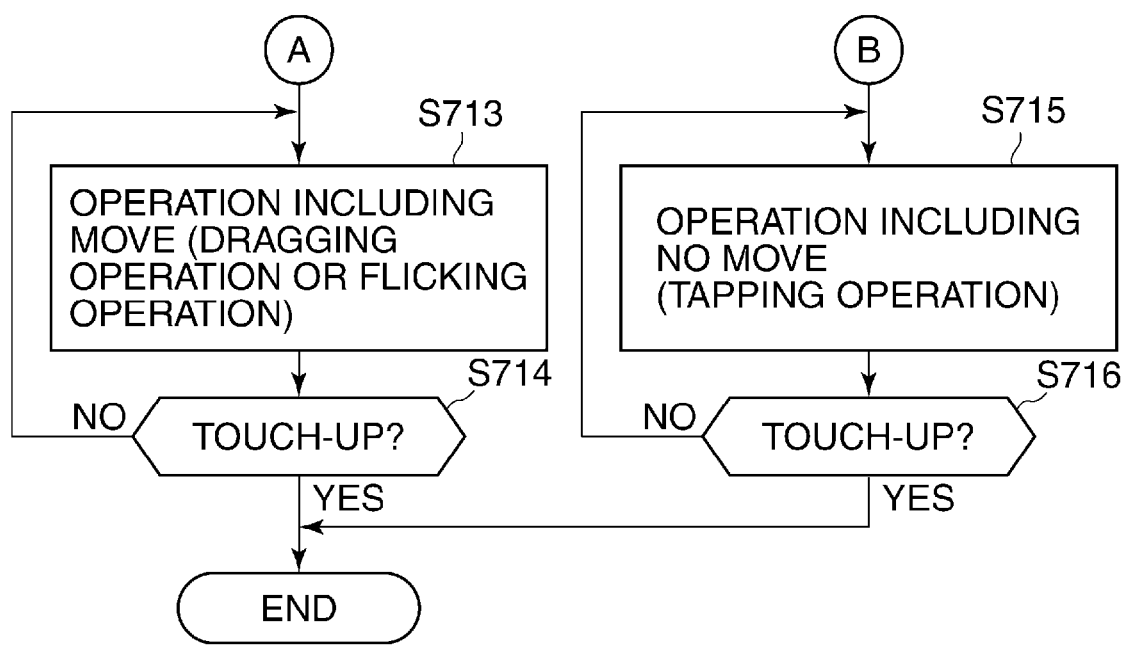
FIG. 8 is a flowchart of the procedure of the input operation determination process according to the second embodiment.

Referring next to FIGS. 6 to 8, a description will be given of a second embodiment of the present invention. FIG. 6 is a view showing an exemplary user interface screen displayed by an input apparatus according to the second embodiment. FIGS. 7 and 8 are flowcharts of the procedure of an input operation determination process according to the second embodiment. The present embodiment has the same arrangement as that of the first embodiment described above, and hence description thereof is omitted.

In the present embodiment, the user interface screen is provided with regions where an operation including move (a dragging operation or a flicking operation) is invalid, and a region where an operation including no move (a tapping operation) is invalid, and the input operation determination process is performed according to the regions. The present embodiment differs from the second embodiment in this respect.

Specifically, as shown in FIG. 6, the user interface screen is provided with a region 601 where an operation including move (a dragging operation or a flicking operation) is invalid, and a region 602 where an operation including no move (a tapping operation) is invalid. The region 601 where an operation including move is invalid is comprised of upper and lower regions of the user interface screen, in which operation buttons that do not have to accept a dragging operation, a flicking operation, and so on (such as a "MENU" button and an "EDIT" button) are placed.

On the other hand, the region 602 where an operation including no move is invalid is comprised of spaces between thumbnail images 603 displayed in an image display region in a central part of the user interface screen, and does not have to accept a tapping operation.

When the user performs touch-down on the region 601 where an operation including move is invalid, the CPU 101 determines that the touch-down is touch-down in an operation including no move, that is, a tapping operation. On the other hand, when the user carries out touch-down on the region 602 where an operation including no move is invalid, the CPU 101 determines that the touch-down is touch-down in an operation including move, that is, a dragging operation or a flicking operation.

The CPU 101 performs the input operation determination process on the user interface screen according to the flowcharts of FIGS. 7 and 8. The procedure of the input operation determination process according to the flowcharts of FIGS. 7 and 8 is performed by the CPU 101 in accordance with a program stored in the program storage unit 102.

As shown in FIG. 7, the CPU 101 waits until touch-down is performed on the touch panel 104 (step S701). When touch-down is performed, the CPU 101 determines whether or not a touch position is inside a region where an operation including move (a dragging operation or a flicking operation) is invalid (step S702).

When determining in the step S702 that the touch position is not inside the region where an operation including move is invalid, the CPU 101 determines whether or not the touch position is inside a region where an operation including no move (a tapping operation) is invalid (step S703). When determining here that the touch position is not inside the region where an operation including no move is invalid, the CPU 101 clears the timer (step S704).

Next, the CPU 101 starts the timer (step S705). Then, the CPU 101 records coordinate information indicative of touch positions sent from the touch panel 104 in a time period T measured by the timer (a time period elapsed from touch-down to the present time) in the memory 103 (step S706).

Next, the CPU 101 determines whether or not the time period T measured by the timer has exceeded a predetermined time period Tmax (step S707). When determining that the time period T measured by the timer has not exceeded the predetermined time period Tmax, the CPU 101 determines whether or not touch-up has been performed on the touch panel 104 (step S708). When determining that touch-up has not been performed, the CPU 101 returns to the step S706.

When determining in the step S708 that touch-up has been performed, the CPU 101 calculates variances Sx and Sy of the touch positions based on the coordinate information indicative of the touch positions recorded in the memory 103 (step S709).

Then, the CPU 101 determines whether or not the calculated variances Sx and Sy are smaller than respective threshold values Sxmax and Symax (step S710). When determining that the calculated variances Sx and Sy are smaller than the respective threshold values Sxmax and Symax, the CPU 101 determines that the input operation is an operation including no move (a tapping operation) (step S711). Then, the CPU 101 terminates the present process.

When determining in the step S710 that the calculated variances Sx and Sy are not smaller than the respective threshold values Sxmax and Symax, the CPU 101 determines that the input operation is an operation including move (a dragging operation or a flicking operation) (step S712). Then, the CPU 101 terminates the present process.

When determining in the step S707 that the time period T measured by the timer has exceeded the predetermined time period Tmax, the CPU 101 determines that the input operation is an operation including move (a dragging operation or a flicking operation) (step S713). In response to the determination, in order that processes can be started in a manner successively following changes in touch position caused by the operation including move, coordinate information on present touch positions is successively passed to applications carrying out the processes. Then the CPU 101 determines whether or not touch-up has been performed (step S714). When determining here that touch-up has not been performed, the CPU 101 returns to the step S713. When determining in the step S714 that touch-up has been performed, the CPU 101 determines that the operation including move has ended, and terminates the present process.

When determining in the step S703 that the touch position is inside the region where an operation including no move is invalid, the CPU 101 determines that the input operation is an operation including move as shown in FIG. 8 (step S713). Then, the CPU 101 determines whether or not touch-up has been performed (step S714). When determining here that touch-up has not been performed, the CPU 101 returns to the step S713. When determining in the step S714 that touch-up has been performed, the CPU 101 determines that the operation including move has ended, and terminates the present process.

When determining in the step S702 that the touch position is inside the region where an operation including move is invalid, the CPU 101 determines that the input operation is an operation including no move as shown in FIG. 8 (step S715). Here, it is determined that the touch position by the input operation is a touch position by an operation including no move (a tapping operation). Then, the CPU 101 determines whether or not touch-up has been performed (step S716). When determining here that touch-up has not been performed, the CPU 101 returns to the step S715. When determining in the step S716 that touch-up has been performed, the CPU 101 determines that the operation including no move has ended, and terminates the present process.

As described above, because there are provided the region where an operation including no move (a tapping operation) is invalid and the region where an operation including move (a dragging operation or a flicking operation) is invalid, erroneous determination of an input operation can be prevented. Moreover, because operations have to be determined with respect to only the regions where an operation including no move and an operation including move are valid, loads on the CPU 101 imposed by the determination process therefor (such as calculation of the variances S) can be reduced.

Moreover, there may be further provided a region where a dragging operation is invalid and a region where a flicking operation is invalid.

Figure 9:
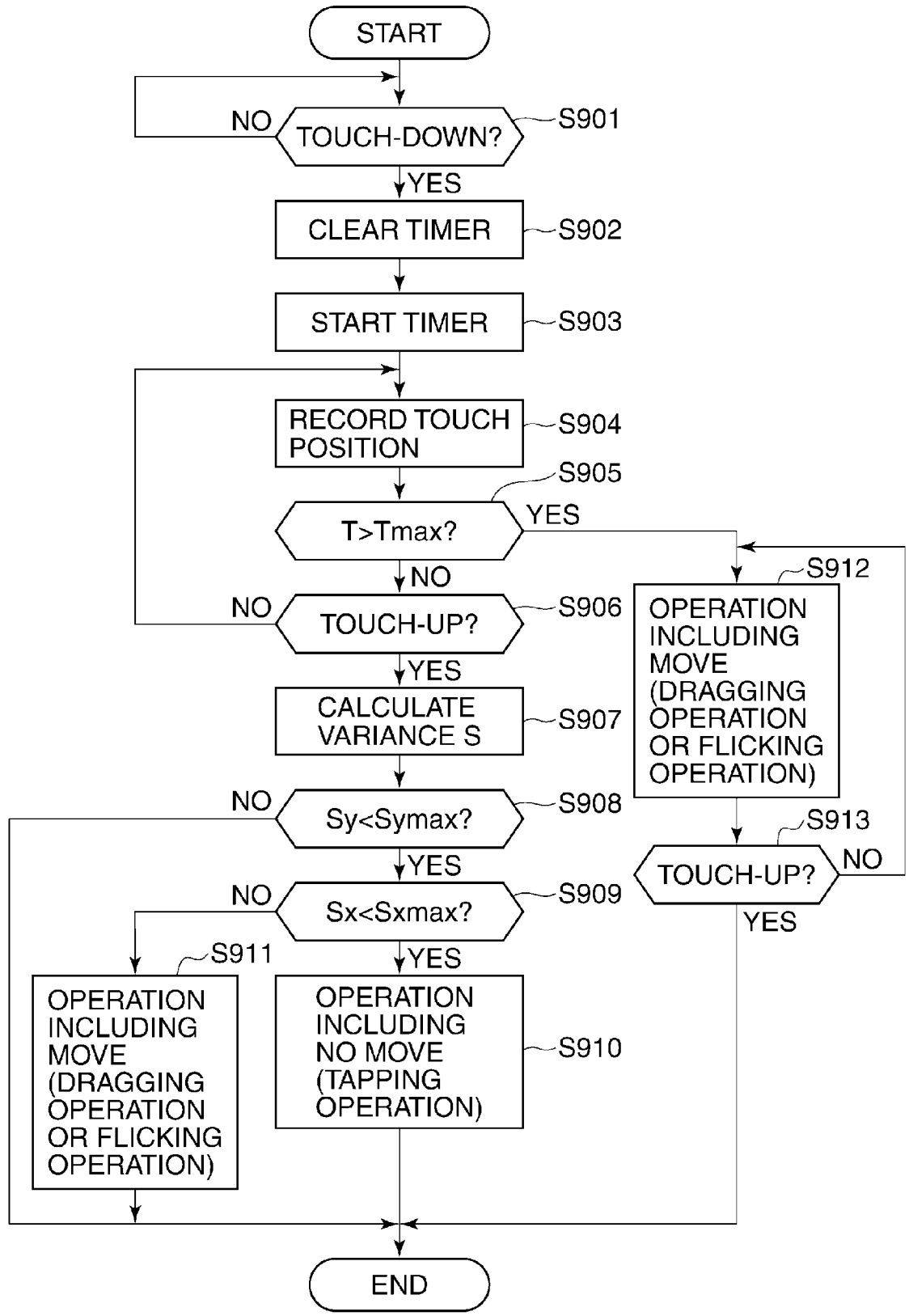
FIG. 9 is a flowchart of the procedure of an input operation determination process according to a third embodiment of the present invention.

Referring next to FIG. 9, a description will be given of a third embodiment of the present invention. FIG. 9 is a flowchart of the procedure of an input operation determination process according to the third embodiment. The present embodiment has the same arrangement as that of the first embodiment described above, and hence description thereof is omitted.

In the present embodiment, the input operation determination process is performed in a case where in an operation including move (a dragging operation or a flicking operation), the direction of move is limited to only one of directions of the x axis and the y axis of the touch panel 104. The present embodiment differs from the above described first embodiment in this respect.

For example, on the user interface screen shown in FIG. 2A, the region where the list of the thumbnail images 202 is displayed can be scrolled in the direction of the x axis but cannot be scrolled in the direction of the y axis by an operation including move (a dragging operation or a flicking operation). Thus, move in the direction of the y axis is invalid, and when the user performs move in the direction of the y axis, the CPU 101 ignores the move in the direction of the y axis.

Referring to FIG. 9, a description will be given of the input operation determination process performed in the case where the direction of move is limited to the direction of the x axis. FIG. 9 is a flowchart of the procedure of the input operation determination process performed in the case where the direction of a move is limited to only the direction of the x axis. The procedure in the flowchart of FIG. 9 is performed by the CPU 101 in accordance with a program stored in the program storage unit 102.

Referring to FIG. 9, the CPU 101 waits until touch-down is performed (step S901). Here, when touch-down is performed, the CPU 101 clears the timer (step S902).

Then, the CPU 101 starts the timer (step S903). Then, the CPU 101 records coordinate information indicative of touch positions in the memory 103 (step S904).

Next, the CPU 101 determines whether or not the time period T measured by the timer has exceeded the predetermined time period Tmax (step S905). Here, when determining that the time period T measured by the timer has not exceeded the predetermined time period Tmax, the CPU 101 determines whether or not touch-up has been performed (step S906). When determining here that touch-up has not been performed, the CPU 101 returns to the step S904.

When determining in the step S906 that touch-up has been performed, the CPU 101 calculates the variances Sx and Sy of the touch positions based on the coordinate information indicative of the touch positions recorded in the memory 103 (step S907).

Then, the CPU 101 determines whether or not the calculated variance Sy is smaller than the threshold value Symax (step S908). When determining that the calculated variance Sy is smaller than the threshold value Symax, the CPU 101 determines whether or not the calculated variance Sx is smaller than the threshold value Sxmax (step S909). When determining that the calculated variance Sx is smaller than the threshold value Sxmax, the CPU 101 determines that the input operation is an operation including no move (a tapping operation) (step S910). Then, the CPU 101 terminates the present process.

When determining in the step S909 that the calculated variance Sx is not smaller than the threshold value Sxmax, the CPU 101 determines that the input operation is an operation including move (a dragging operation or a flicking operation) (step S911). Then, the CPU 101 terminates the present process.

When determining in the step S908 that the calculated variance Sy is not smaller than the threshold value Symax (the variance Sy is equal to or greater than the threshold value Symax), the CPU 101 determines that the input operation is invalid because move is being performed in the direction of the y-axis which is not permitted, and then terminates the present process.

When determining in the step S905 that the time period T measured by the timer has exceeded the predetermined time period Tmax, the CPU 101 determines that the input operation is an operation including move (a dragging operation or a flicking operation) (step S912). Then, the CPU 101 determines whether or not touch-up has been performed (step S913). When determining here that touch-up has not been performed, the CPU 101 returns to the step S912. When determining in the step S913 that touch-up has been performed, the CPU 101 determines that the operation including move has ended, and then terminates the present process.

As described above, according to the present embodiment, when the user performs move in the direction of the y axis such that the variance Sy is equal to or greater than the threshold value Symax in a region where move in only the direction of the x axis is allowed, an operation including the move in the direction of the y axis is ignored. As a result, erroneous determination of an input operation, which is caused by such move in the direction of the y axis in a region where move in only the direction of the x axis is allowed, can be prevented, and thus operability can be enhanced.

Moreover, because it is determined that an input operation is an operation including move when a touch-on state has continued for a time period longer than the predetermined time period Tmax, an input operation can be accurately determined even when such move that touch positions swing in the direction of the x axis and the direction of the y axis is performed.

Although in the description of the present embodiment, move in the direction of the y axis is invalid, an input operation can be accurately determined in the same way in a case where the direction of the x axis is invalid. In this case, comparison between the variance Sx and the threshold value Sxmax is performed in lieu of comparison between the variance Sy and the threshold value Symax in the step S908, and comparison between the variance Sy and the threshold value Symax is performed in lieu of comparison between the variance Sx and the threshold value Sxmax in the step S909.

It should be noted that control of the CPU 101 may be exercised by a piece of hardware or may be shared by a plurality of hardware. Moreover, although in the descriptions of the above described embodiments, the present invention is applied to an information processing apparatus (PC), the present invention is not limited to this. Specifically, the present invention may be applied to various devices such as a PDA, a digital camera, and a digital video camera using an input apparatus having a touch panel. Further, the present invention may be applied to devices such as a cellular phone unit, a portable image viewer, a display provided in a printer unit for selection and confirmation of an image to be printed, and a digital photo frame.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-294624 filed Dec. 25, 2009, which is hereby incorporated by reference herein in its entirety.

What is claimed is:

1. An input apparatus comprising:
    a touch panel on which an input operation is performed by a user;
    an obtainment unit configured to obtain, in chronological order, touch positions in a time period from touch-down to touch-up by the input operation on said touch panel;
    a calculation unit configured to calculate a statistical variance of the touch positions based on both the touch positions obtained by said obtainment unit and an average value of the obtained touch positions; and
    a determination unit configured to determine whether the input operation is an operation including no move or an operation including move based on the statistical variance calculated by said calculation unit;
    wherein when the calculated statistical variance is smaller than a threshold value, said determination unit determines that the input operation is the operation including no move, and when the calculated statistical variance is not smaller than the threshold value, said determination unit determines that the input operation is the operation including move.

2. The input apparatus according to claim 1, wherein when the touch-up is performed before a predetermined time period elapses after the touch-down, said determination unit determines the input operation based on the calculated statistical variance.

3. The input apparatus according to claim 1, wherein when a predetermined time period elapses after the touch-down before the touch-up is performed, said determination unit determines that the input operation is the operation including move without determining the input operation based on the calculated statistical variance.

4. The input apparatus according to claim 1, further comprising a unit configured to calculate a threshold value based on a statistical variance of touch positions when touch-down is performed on a trial basis through different input operations by the user, and set the calculated threshold value as the threshold value.

5. The input apparatus according to claim 1, further comprising a second determination unit configured to, when an input operation is performed on a predetermined region of said touch panel in which predetermined operations are invalid, determine that the input operation is an input operation different from the predetermined operations.

6. The input apparatus according to claim 1, wherein when an input operation is performed on a region of said touch panel in which a direction in which an input operation including move is allowed is determined in advance, said calculation unit calculates a statistical variance of touch positions in a direction different from the direction in which an input operation including move is allowed based on the touch positions obtained by said obtainment unit, and
    when the statistical variance of the touch positions in the direction different from the direction in which an input operation including move is allowed is not smaller than a threshold value, said determination unit determines that the input operation is invalid.

7. A control method for an input apparatus having a touch panel on which an input operation is performed by a user, comprising:
    an obtainment step of obtaining, in chronological order, touch positions in a time period from touch-down to touch-up by the input operation on the touch panel;
    a calculation step of calculating a statistical variance of the touch positions based on both the touch positions obtained in said obtainment step and an average value of the obtained touch positions; and
    a determination step of determining whether the input operation is an operation including no move or an operation including move based on the statistical variance calculated in said calculation step;
    wherein when the calculated statistical variance is smaller than a threshold value, it is determined that the input operation is the operation including no move, and when the calculated statistical variance is not smaller than the threshold value, it is determined that the input operation is the operation including move.

8. A computer-readable non-transitory storage medium storing a program for controlling an input apparatus having a touch panel on which an input operation is performed by a user, comprising:

an obtainment step of obtaining, in chronological order, touch positions in a time period from touch-down to touch-up by the input operation on the touch panel;

a calculation step of calculating a statistical variance of the touch positions based on both the touch positions obtained in said obtainment step and an average value of the obtained touch positions; and a determination step of determining whether the input operation is an operation including no move or an operation including move based on the statistical variance calculated in said calculation step;

wherein when the calculated statistical variance is smaller than a threshold value, it is determined that the input operation is the operation including no move, and when the calculated statistical variance is not smaller than the threshold value, it is determined that the input operation is the operation including move.

9. The input apparatus according to claim 1, wherein said calculation unit calculates respectively the statistical variance of the touch positions in a direction of an X axis and the statistical variance of the touch positions in a direction of a Y axis.

10. The input apparatus according to claim 1, wherein said calculation unit calculates the statistical variance of the touch positions based on a value obtained by accumulating squares of differences obtained by subtracting the average value of the touch positions from the respective touch positions.

11. The input apparatus according to claim 1, wherein when the average value of the touch positions is defined as A, the number of the touch positions is defined as n, the respective touch positions are defined as P1 to Pn, and the statistical variance of the touch positions is defined as S, said calculation unit calculates S based on the following equation:

$$S=\{(P1-A)^2+\ldots+(Pn-A)^2\}\div n.$$

* * * * *